(12) United States Patent
Ase et al.

(10) Patent No.: US 7,188,980 B2
(45) Date of Patent: Mar. 13, 2007

(54) HEAD LIGHT SYSTEM

(75) Inventors: Yukimi Ase, Saitama (JP); Shigeru Kodaira, Saitama (JP); Tetsuya Kondo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 10/703,554

(22) Filed: Nov. 10, 2003

(65) Prior Publication Data

US 2004/0145898 A1    Jul. 29, 2004

(30) Foreign Application Priority Data

Dec. 2, 2002    (JP) .............................. 2002-349771
Dec. 26, 2002   (JP) .............................. 2002-377124

(51) Int. Cl.
*F21V 7/04*    (2006.01)

(52) U.S. Cl. ..................... 362/476; 362/518; 362/544; 362/548; 362/549

(58) Field of Classification Search ................ 362/548, 362/549, 544, 543
See application file for complete search history.

(56) References Cited

U.S. PATENT DOCUMENTS

| | | | |
|---|---|---|---|
| 4,563,730 A * | 1/1986 | Saito ........................... | 362/516 |
| 4,760,506 A * | 7/1988 | Mochizuki et al. ......... | 362/548 |
| 5,722,768 A * | 3/1998 | Suzuki et al. ............... | 362/265 |
| 6,059,437 A * | 5/2000 | Shibuya et al. ............. | 362/547 |
| 6,092,918 A * | 7/2000 | Ikegami ...................... | 362/544 |
| 6,302,568 B1 * | 10/2001 | Ohtaki ........................ | 362/546 |
| 6,652,130 B2 * | 11/2003 | Mochizuki et al. ......... | 362/517 |
| 7,008,098 B2 * | 3/2006 | Yamaguchi et al. ........ | 362/547 |
| 7,090,383 B2 * | 8/2006 | Kondo et al. ............... | 362/518 |
| 2001/0002170 A1 * | 5/2001 | Sanuki et al. ............... | 362/523 |
| 2002/0024810 A1 * | 2/2002 | Nagakura .................... | 362/263 |
| 2002/0167819 A1 * | 11/2002 | Yamaguchi et al. ........ | 362/547 |

FOREIGN PATENT DOCUMENTS

| | | |
|---|---|---|
| JP | 11-043087 A | 2/1999 |
| JP | 2000-106017 A | 4/2000 |

* cited by examiner

*Primary Examiner*—Sandra O'Shea
*Assistant Examiner*—Anabel Ton
(74) *Attorney, Agent, or Firm*—Birch, Stewart, Kolasch & Birch, LLP

(57) ABSTRACT

To provide a head light system comprising first and second bulbs, wherein a coupler can be attached and detached smoothly and the appearance can be made favorable. A first movable-side coupler and a second movable-side coupler are attached to and detached from a first fixed-side coupler for a first bulb and a second fixed-side coupler for a second bulb, respectively. The first fixed-side coupler and the second fixed-side coupler are disposed substantially in the same plane. The attaching and detaching directions of the first and second movable-side couplers are substantially perpendicular to the longitudinal directions of the first bulb and the second bulb. The first fixed-side coupler is so disposed that the second fixed-side coupler is not located in the attaching and detaching direction of the first movable-side coupler attached to and detached from the first fixed-side coupler.

17 Claims, 7 Drawing Sheets

BACKGROUND
ART**

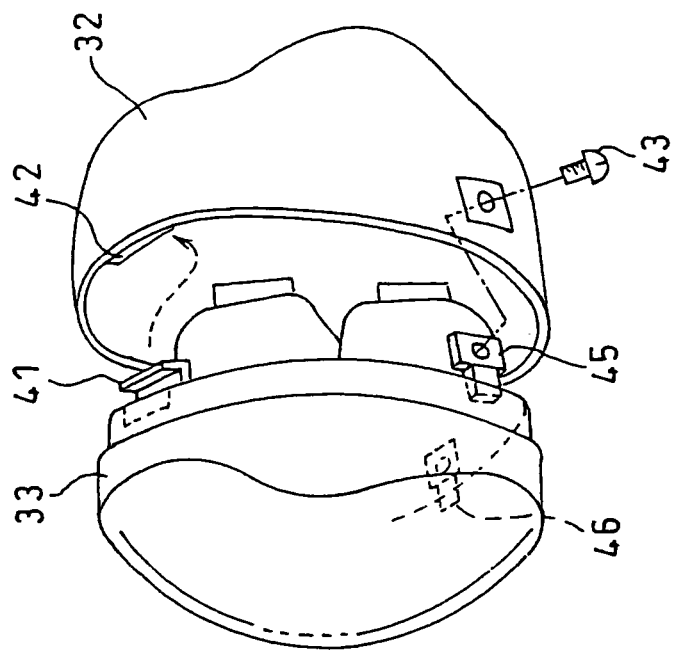
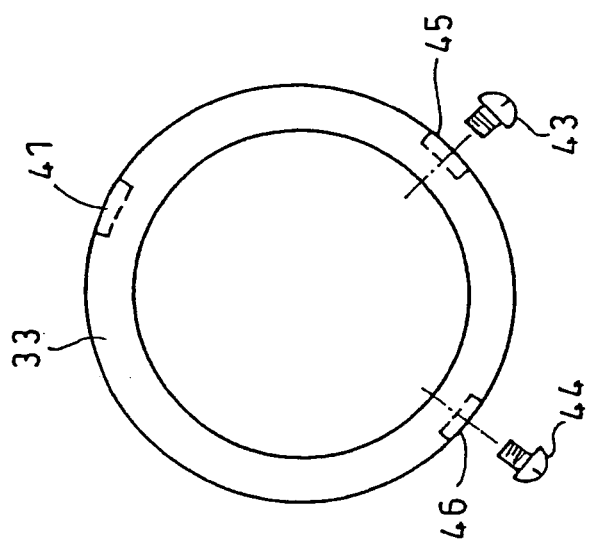
FIG. 6
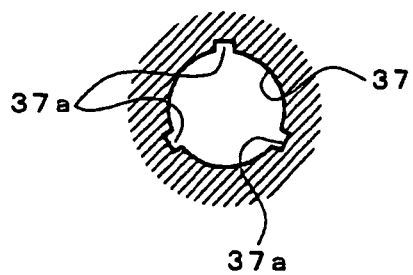

HEAD LIGHT SYSTEM

CROSS-REFERENCE TO RELATED APPLICATIONS

The present application claims priority under 35 USC 119 to Japanese Patent Application No. 2002-349771 filed on Dec. 2, 2002 and Japanese Patent Application No. 2002-377124 filed on Dec. 26, 2002 the entire contents thereof are hereby incorporated by reference.

BACKGROUND OF THE INVENTION

1. Field of the Invention

The present invention relates to a head light system, and particularly to a head light system having such a structure as to permit smooth attaching and detaching of couplers. In addition, the present invention relates to a headlamp system for a vehicle which has a structure for reducing the thermal influence exerted on a harness and the like disposed on the rear side of a headlamp main body.

2. Description of Background Art

A head light system mounted to a vehicle such as a motorcycle comprises a bulb, a reflector for reflecting the light generated by the bulb toward the front side of the vehicle, a case for accommodating the bulb and the reflector, and a lens provided on the front side of the reflector.

A head light system comprising two bulbs disposed in the upper-lower direction is disclosed in Japanese Patent Laid-open No. Hei 11-43087. In this publication, a structure in which first and second movable-side couplers are respectively attached to and detached from first and second bulbs in the longitudinal direction of the latter and a structure in which the positions of first and second fixed-side couplers for the first and second bulbs are mutually staggered in the front-rear direction, are shown. The first and second movable-side couplers are inserted, respectively, into the first and second fixed-side couplers, whereby power supply wirings for the bulbs are attained.

Another example of the headlamp system for a vehicle is disclosed in Japanese Patent Laid-open No. 2000-106017. A reflector of this headlamp system comprises a reflective surface formed by providing an undercoating on a reflector base material composed of a synthetic resin and further providing a vapor deposited silver film and a topcoat layer thereon. A rear portion of the reflector is covered with a lamp body, or case, made of a synthetic resin.

However, since the head light system disclosed in the above-mentioned publication has a structure in which the first and second movable-side couplers are respectively attached to and detached from the first and second bulbs in the longitudinal direction of the latter and the structure in which the positions of the first and second fixed-side couplers for the first and second bulbs are mutually staggered in the front-rear direction, there is a problem in that the length of the system in the front-rear direction is enlarged, and the space required for laying out the components and for attaching and detaching operations is enlarged.

In addition, since the thickness of the system in the front-rear direction is large, the appearance thereof as viewed from a lateral side is spoiled in the case of a naked-type system in which the head light system is not covered with a fairing or the like.

In the case where a plurality of bulbs are used for increasing the amount of light, it may be impossible to obtain a sufficient heat resistance with a reflector formed of a synthetic resin base material. Though the heat resistance can be enhanced by enlarging the reflector in size, the overall size of the headlamp cannot be extremely enlarged, from the viewpoints of appearance and layout. In consideration of this, it may be contemplated to form the reflector of a highly heat-resistant metal, for example, an aluminum alloy.

However, since metal has a high thermal conductivity, a metallic reflector exerts a thermal influence on the rear side thereof. A harness is disposed between the reflector and a case on the rear side thereof, and, in consideration of the influence of the heat conducted from the reflector, it is necessary to adopt a highly heat-resistant harness. In the headlamp system described in Japanese Patent Laid-open No. 2000-106017, a wire connection portion between the harness and the bulb (electric discharge lamp) is covered with a cover, but the covering of the wire connection portion with the cover makes the bulb maintenance complicated. Further, the heat conducted through the reflector exerts a thermal influence also on the synthetic resin made case.

In order to solve this problem, there may be contemplated a structure in which the first and second movable-side couplers are attached to and detached from the first and second bulbs in a direction perpendicular to the longitudinal direction of the latter and a structure in which the positions of the first and second fixed-side couplers for the first and second bulbs are in the same plane. In this case, however, there is a new problem that the interference between the first and second movable-side couplers for the first and second bulbs and the interference by the wirings extending from the movable couplers make it impossible to smoothly attach and detach the movable-side couplers.

SUMMARY AND OBJECTS OF THE INVENTION

It is an object of the present invention to provide a head light system including first and second bulbs, wherein couplers can be smoothly attached and detached and the appearance can be made favorable.

In order to attain the above object, the present invention includes a head light system including a first bulb, a second bulb, a first fixed-side coupler attached to the first bulb, and a second fixed-side coupler attached to the second bulb. The first fixed-side coupler and the second fixed-side coupler are so disposed that the attaching and detaching direction of a first movable-side coupler and a second movable-side coupler, respectively, attached to and detached from the first fixed-side coupler and the second fixed-side coupler is perpendicular to the longitudinal direction of the first bulb and the second bulb and that the first fixed-side coupler and the second fixed-side coupler are disposed substantially in the same plane. The first fixed-side coupler is so disposed that the second fixed-side coupler is not located in the attaching and detaching direction of the first movable-side coupler attached to and detached from the first fixed-side coupler.

In addition, the present invention is characterized in that the first fixed-side coupler and the second fixed-side coupler are disposed on a substantially vertical straight line in a side view. The attaching and detaching direction of the first movable-side coupler to and from the first fixed-side coupler is at a fixed angle against the vertical direction in a rear view. In addition, the attaching and detaching direction of the second movable-side coupler to and from the second fixed-side coupler is substantially the vertical direction.

Further, the present invention provides the first fixed-side coupler and the second fixed-side coupler to be disposed close to each other.

In addition, the present invention provides a boundary wall that is disposed at the boundary between a first reflector for reflecting light generated by the first bulb and a second reflector for reflecting light generated by the second bulb, and the boundary wall is provided with a cutout.

Furthermore, the present invention is provided with a first bulb that is for a low beam, and a second bulb that is for a high beam.

According to another feature of the present invention, since the first movable-side coupler does not make contact with the second fixed-side coupler at the time of attaching and detaching the first movable-side coupler to and from the first fixed-side coupler, the first movable-side coupler can be smoothly attached and detached. In addition, since the first and second fixed-side couplers are disposed in the same plane, it is possible to reduce the thickness of the system in the front-rear direction and, further, to make neat the laying out of a harness on the rear side.

In addition, according to another characteristic feature, the first movable-side coupler can be smoothly attached and detached without interference with the second fixed-side coupler, and the second fixed-side coupler can be easily attached and detached by forces in upward and downward directions.

Besides, according to another feature of the present invention, the head light system can be constituted to be compact in the vertical direction, and it is possible to neatly lay out of the harness on the rear side.

In addition, the orientation characteristics of light generated by the first and second bulbs can be made favorable, and troubles due to generation of heat at the boundary wall can be prevented.

Furthermore, the low beam generated by the first bulb can be easily cast toward the front side of the vehicle.

It is an object of the present invention to provide a headlamp system for a vehicle which has such a structure so as to make it possible to reduce the thermal influence on a case arising from generation of heat by a bulb and to permit easy maintenance of the bulb.

In order to attain the above objects, the present invention provides a headlamp system for a vehicle including a bulb, a reflector having a reflective surface for reflecting light generated by the bulb to a predetermined emitting direction, a case so disposed as to envelop a rear side portion of the reflector and supporting the reflector, and a harness disposed between the reflector and the case and electrically connected to the bulb. The headlamp system comprises a heat shield plate so disposed so as to cover a rear portion of the reflector between the reflector and the harness.

According to the present invention, the heat generated from the bulb is shielded by the heat shield plate, resulting in that it is difficult for the heat to be transferred to the harness and the case. Therefore, it is unnecessary to raise the heat resistance grades of the harness and the case, and the degree of freedom in selecting materials is increased.

In addition, the present invention provides a reflector that includes a base portion for mounting the bulb thereto, and the heat shield plate comprises a hole for engagement with the outer circumference of the base portion. According to the this characteristic feature, the positional relationship between the heat shield plate and the reflector can be set to a predetermined relationship by simply fitting the heat shield plate to the base portion. Therefore, it is easy to mount the heat shield plate.

In addition, the present invention provides a gap that is provided between the reflector and the heat shield plate.

According to the third characteristic feature, the gap forms a heat insulation layer of air, whereby the heat insulating effect is enhanced.

In addition, in the present invention the heat shield plate is formed of a heat-resistant rubber wherein a high heat insulating effect is obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(a) and 5(b) show a front view and a perspective view of a structure for fixing a head light to a case;

FIG. 6 is a front view showing a fixed-side coupler hole in a reflector;

DETAILED DESCRIPTION OF THE PREFERRED EMBODIMENTS

Figure 1:
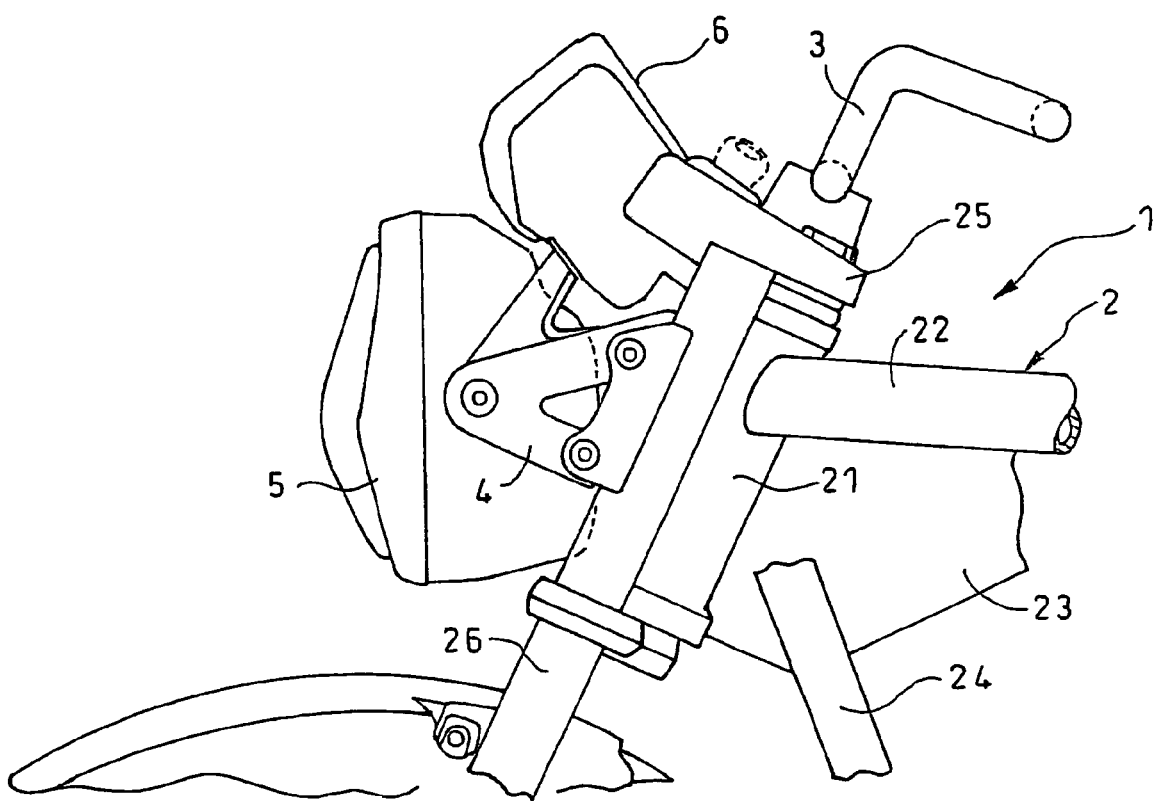
FIG. 1 is a side view of a front portion of a motorcycle comprising a head light system according to one embodiment of the present invention.

FIG. 1 is a side view of a front portion of a motorcycle comprising a head light system according to one embodiment of the present invention. A vehicle body frame 2 of the motorcycle 1 comprises a head pipe 21 located on the front side of the vehicle, a pipe form front frame 22 extending substantially horizontally rearwardly from the head pipe 21, and a lower frame 24 extending downwardly and rearwardly from a bracket 23 connected to both the head pipe 21 and the front frame 22.

At the lower ends of a top bridge 25 connected to an upper portion of the head pipe 21, a front fork 26 is provided for supporting a front wheel (which is not shown). The top bridge 25 is provided at its upper portion with a steeling handle 3. A bracket 4 extends in a forward direction from the front fork 26, and a head light system 5 is supported by the bracket 4. The head light system 5 is of the so-called naked type, i.e., it is not covered with a fairing or the like. Details of the head light system 5 will be described later. An instrument panel 6 is disposed on the upper rear side of the head light system 5.

Figure 2A:
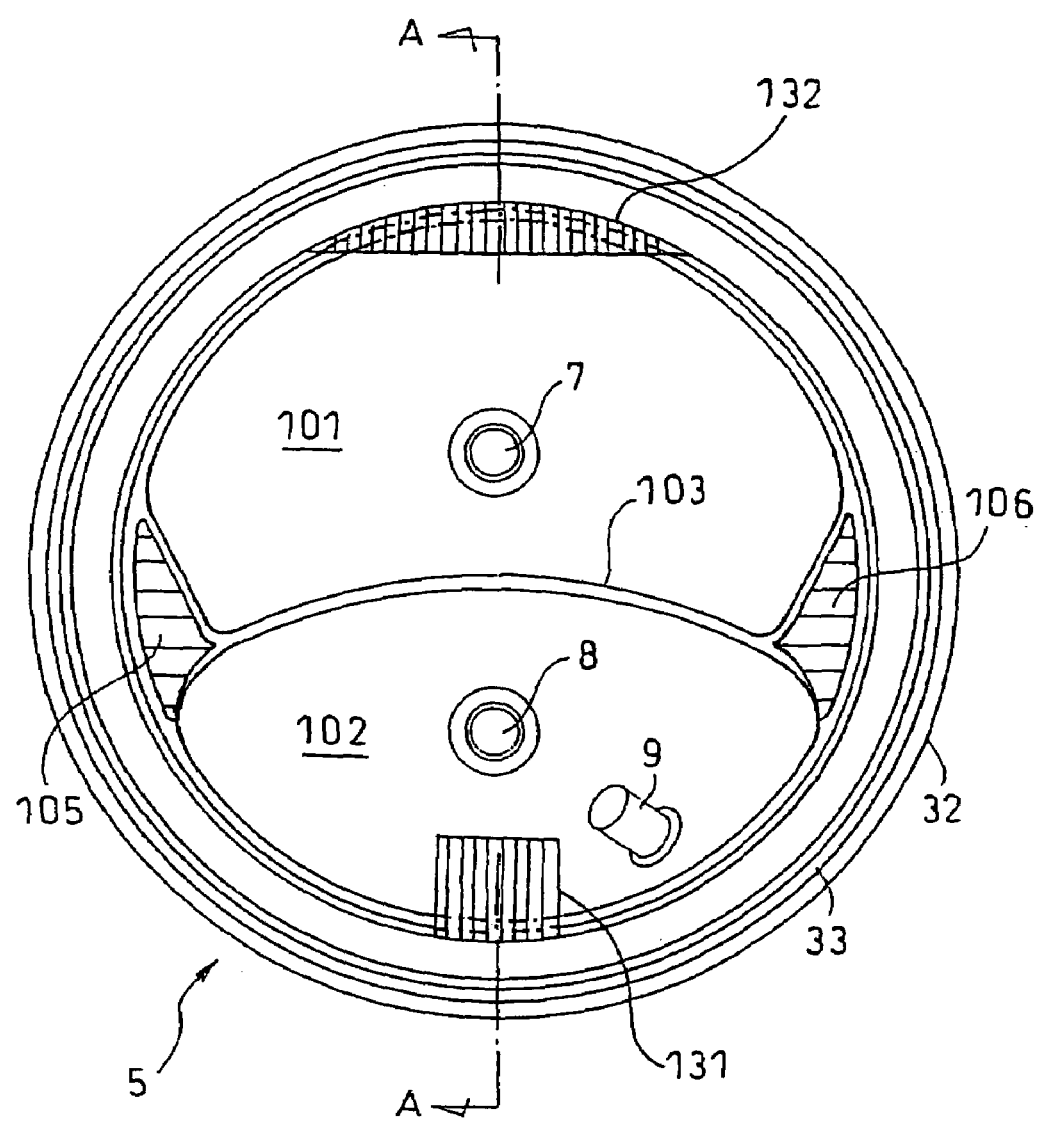
FIG. 2(a) is a front view of the head light system according to the embodiment of the present invention.
Figure 2B:
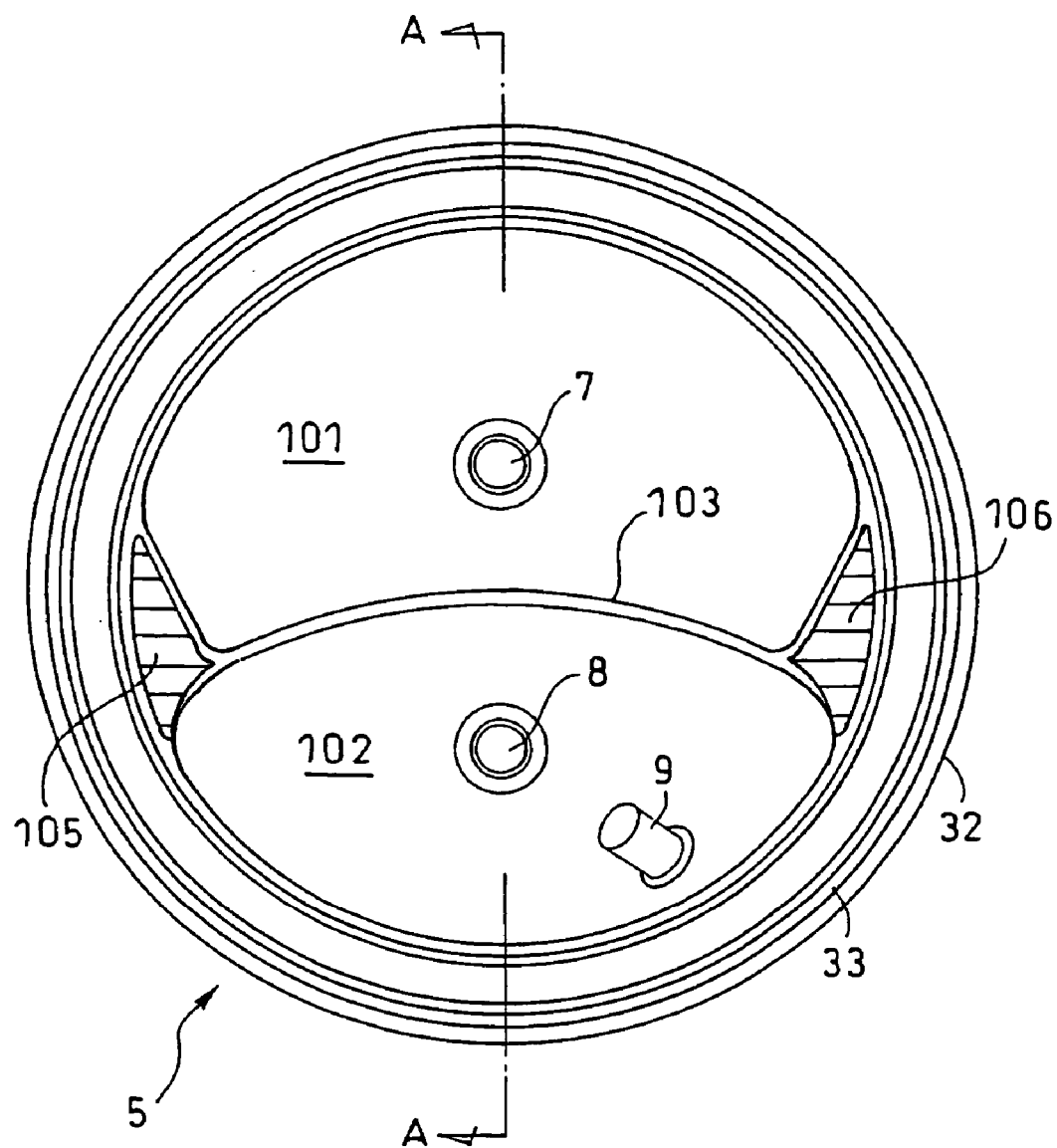
FIG. 2(b) is a front view of the head light system according to another embodiment of the present invention.

Next, the constitution of the head light system 5 will be described in detail. FIGS. 2(a) and 2(b) are front views of the head light system 5, that comprises two bulbs 7, 8 and one auxiliary bulb (position lamp) 9. The bulb 7 is disposed so as to be located at an upper portion at the time of mounting onto a vehicle body and is used for a low beam. A bulb 8 is disposed so as to be located at a lower portion and is used for a high beam. At the time of normal operation, both of the bulbs 7 and 8 are turned on to provide more illumination, and in the case of passing another vehicle or the like, the bulb 8 for the high beam is turned off. The bulb 7 and a fixed-side coupler 11 are constituted as one body, the bulb 8 and a fixed-side coupler 11 are constituted as one body, and they are mounted and fixed to a reflector 10.

Figure 4:
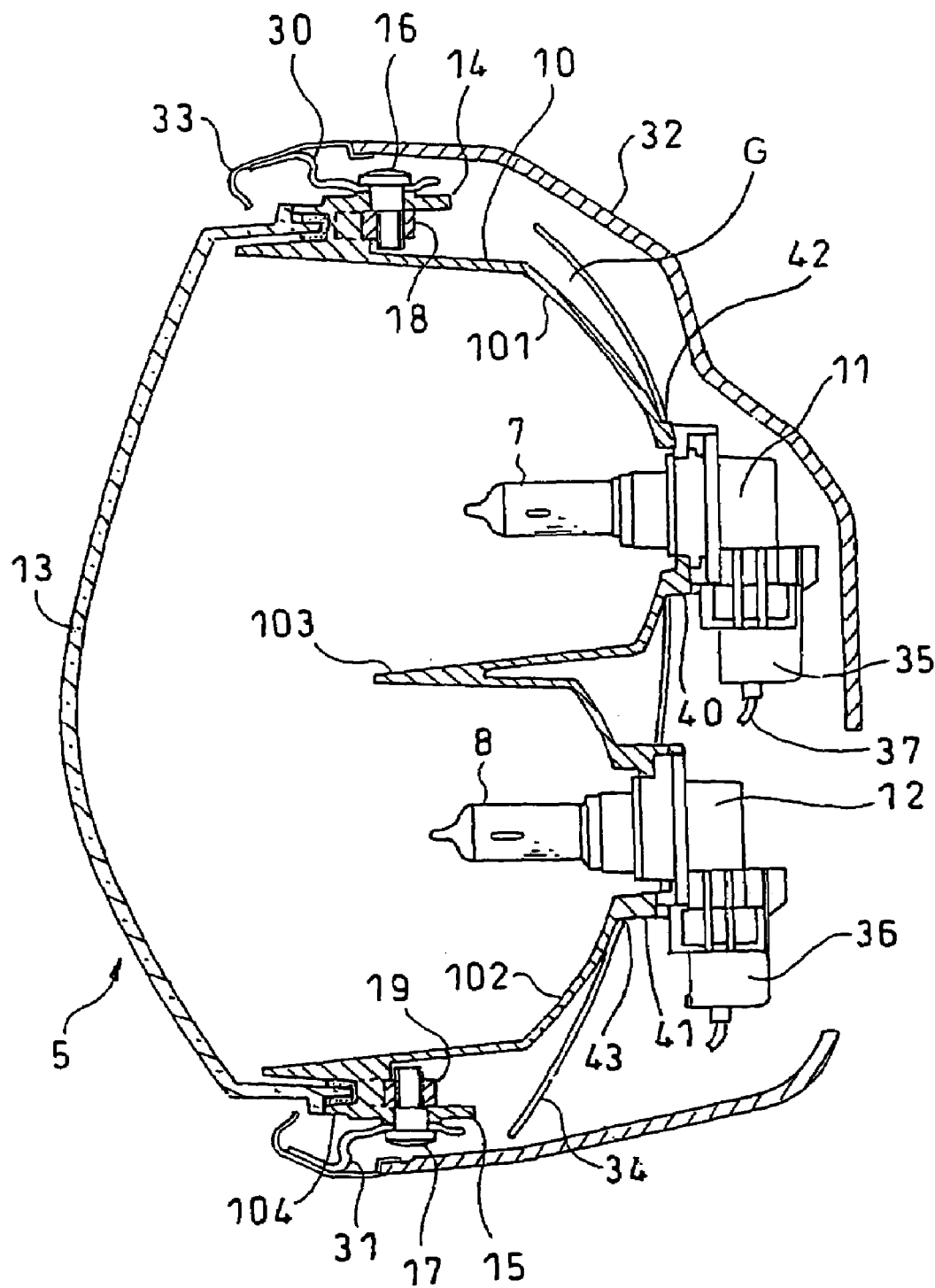
FIG. 4 is a sectional view taken along line A—A of FIG. 1.

The reflector 10 comprises a low beam reflector 101 and a high beam reflector 102, and the shapes of the respective reflectors are so determined that light generated by the bulbs 7 and 8 is discharged toward the front side of the vehicle body in the state of a parallel beam. Further, a boundary wall 103 is disposed at the boundary between the reflectors 101 and 102 so that the reflectors 101 and 102 function independently from each other and each thereof is not interfered by the light from the other thereof As illustrated in FIG. 4, the reflector 10 may be made of metal, for example, die cast, and is provided at its front edge with a groove 104 formed so that the rear edge of a lens 13 conforms thereto. The lens 13 is fitted into the groove 104 so as to cover a front portion of the reflector 10. To ensure that the light is efficiently cast in a downward direction and an upward direction, as illustrated in FIG. 2(a) lens cut portions 131 and 132 for cutting the lens action may be formed at parts on the lower and upper sides of the lens 13.

Seats 14 and 15 are provided respectively at upper and lower portions of the reflector 10, and the seats 14 and 15 are provided with holes so that bolts 16 and 17 can penetrate therethrough. An annular member 33 is formed in a hook shape, with a front portion thereof bent to the inside. Stays 30 and 31 formed of spring steel or the like are welded to the annular member 33, and the stays 30 and 31 formed of metal are also provided with holes so that the bolts 16 and 17 can penetrate therethrough. The stays 30, 31 and the seats 14, 15 are fastened by use of the bolts 16, 17 and nuts 18, 19, whereby the head light comprising the lens 13 and the reflector 10 and the annular member 33 are connected and fixed to each other.

A case 32 is formed of a resin, and is formed in a bowl-like shape so that it can cover the reflector 10 from the rear side. A metallic annular rim 33 is fitted to the front edge of the case 32. The stays 30, 31 are welded to the annular rim 33, and a further stay (not shown) is welded to the annular rim 33; the case 32 is fastened to the stay by a small screw which is not shown. For connecting and fixing the head light and the case 32 to each other, for example, as shown in FIGS. 5(a) and 5(b), a latch portion 41 and stays 45 and 46 are welded to the annular member 33, and the case 32 is provided with a receiving portion 42. The stays 45, 46 are provided with holes through which small screws 43, 44 can penetrate, and the case 32 is also provided with holes through which the small screws 43, 44 can penetrate. The head light and the case 32 can be fixed to each other by engaging the latch portion 41 welded to the annular member 33 to the receiving portion 42 provided in the case 32 and screwing them with the small screws 43, 44 at two (left and right) positions in a lower portion from the outside of the case 32.

Between the reflector 10 and the case 32 on the back side, namely, the rear side of the reflector 10, a heat insulating plate 34 is provided for restraining the transfer of heat of the reflector 10 to the case 32. The heat insulating plate 34 is formed of rubber. The heat shield plate 34 may be formed of a heat-resistant rubber, for example, a rubber corresponding to JIS 2BC6105, and the outside shape thereof is set to be roughly circular so that it can entirely cover the back surface of the reflector 10.

As shown in FIG. 4, the fixed-side couplers 11, 12 for the bulbs 7, 8 do not extend rearwardly along the optical axes of the bulbs 7, 8 but are so disposed that the insertion direction of movable-side couplers 35, 36 attached thereto and detached therefrom is perpendicular to the optical axes. Thus, the fixed-side couplers 11, 12 have a structure in which insertion portions of the movable-side couplers 35, 36 are bent relative to the optical axes.

In addition, the fixed-side coupler 11 and the fixed-side coupler 12 are so disposed that they are substantially in the same plane, in side view. The movable-side couplers 35, 36 can be connected to end portions of the fixed-side couplers 11, 12, respectively. In this case, if the attaching and detaching direction of the movable-side coupler 35 to and from the fixed-side coupler 11 is in the direction of the fixed-side coupler 12 on the lower side thereof, as shown by way of a reference example in FIG. 3(b), the attachment and detachment cannot be carried out smoothly, since the movable-side coupler 35 and a harness 37 extending therefrom interfere with the fixed-side coupler socket 12 at the time of the attachment and detachment. For this reason, the socket 11 is fixed to a rear portion of the reflector 10 at a position deflected by a predetermined angle α so that the harness 37 drawn out through the coupler 35 is not directed toward the socket 12.

Figure 3A:
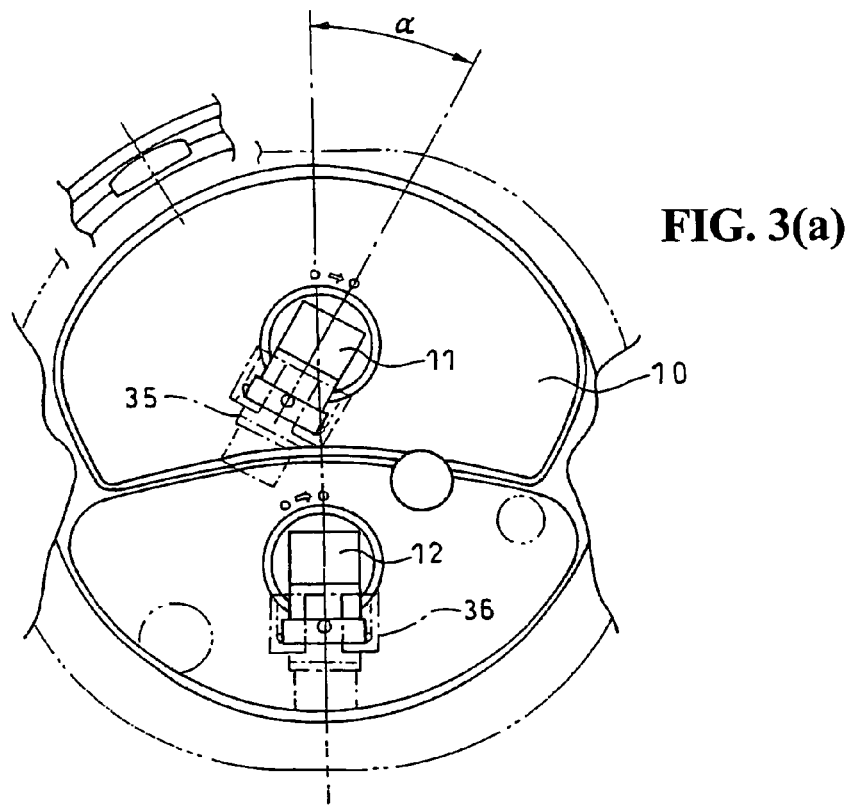
FIGS. 3(a) and 3(b) show rear views of the head light system according to the embodiment of the present invention and background art, respectively.
Figure 3B:
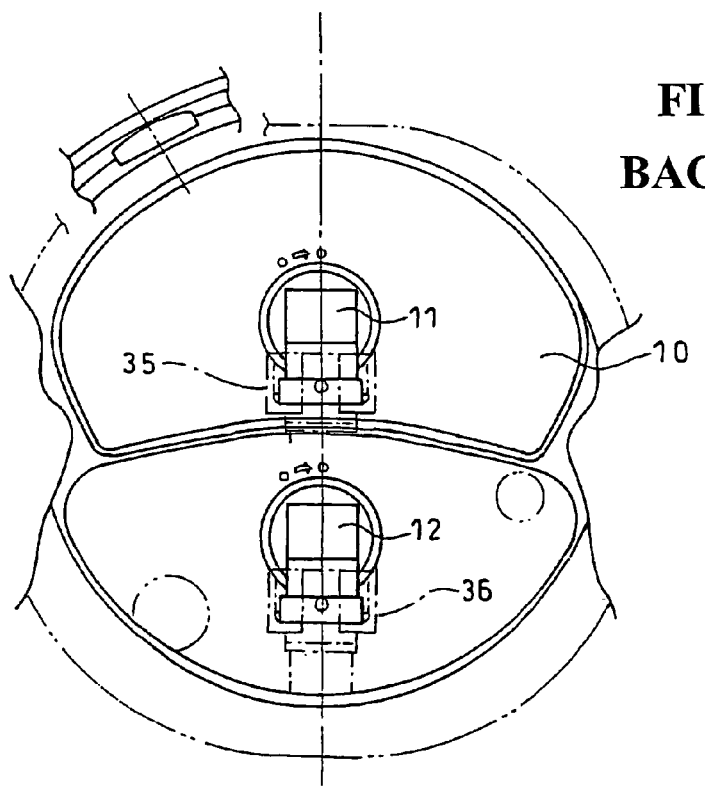

The fixed-side coupler 11 is so disposed as to obviate the interference. Specifically, as shown in FIG. 3(a), the fixed-side coupler 11 is fixed to a rear portion of the reflector 10 in the state of being deflected by a predetermined angle α so that the attaching and detaching direction of the movable-side coupler 35 to and from the fixed-side coupler 11 is not directed toward the fixed-side coupler 12.

For this purpose, for example, a cam surface, or a gradient surface, is provided so that after the fixed-side coupler 11 is inserted into a hole formed in a rear portion of the reflector 10, with the bending direction thereof directed toward the fixed-side coupler 12, the fixed-side coupler 11 is fixed to the reflector 10 at a position reached by a clockwise turning therefrom by the angle α. The gradient surface may be provided in either of the fixed-side coupler 11 and the reflector 10.

Figure 7:
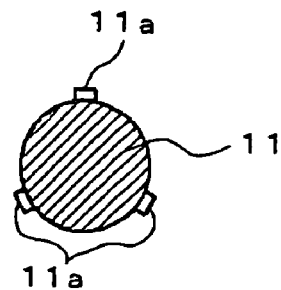
FIG. 7 is a sectional view of a fixed-side coupler.
Figure 8:
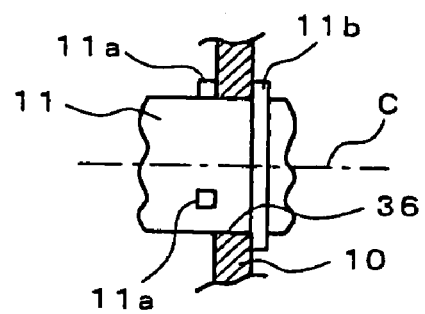
FIG. 8 shows an engaged condition of the reflector and the fixed-side coupler.

A specific example of constitution for fixing the movable coupler 11 to the fixed-side coupler 37 is shown in FIGS. 6 to 8. FIG. 6 shows a hole 37 provided in the reflector 10 for insertion of the fixed-side coupler 11. FIG. 7 is a sectional view of an essential part of the fixed-side coupler 11. FIG. 8 is a sectional view of an essential part of the reflector 10, with the fixed-side coupler 11 mounted thereto.

The hole 37 comprises at least three cutouts 37a in the periphery thereof. On the other hand, the movable-side coupler 11 is provided with latch portions 11a at such an interval so that they are fitted in the cutouts 37a. Dimensions of individual portions are so determined that when the movable-side coupler 11 is inserted into the hole 37 in the reflector 10, with the latch portions 11a adjusted to the cutouts 37a, and the movable-side coupler 11 is rotated by the angle α around the optical axis c, the latch portions 11a and a flange 11b of the movable-side coupler 11 clamp the circumferential edge of the hole 37 in the reflector 10 therebetween.

Incidentally, the fixed-side coupler 12 and a hole in the reflector 10 for insertion of the fixed-side coupler 12 are also formed in a manner similar to the above. To ensure that the attaching and detaching direction of the movable-side coupler 35 to and from the fixed-side coupler 12 is not directed toward the fixed-side coupler 11, for example, as shown in FIG. 3(a), the fixed-side coupler 12 is fixed to a rear portion of the reflector 10 in the state of being so disposed that the attaching and detaching direction of the movable-side coupler 36 to and from the fixed-side coupler 12 is substantially in the vertical direction, as viewed from the back side.

As illustrated in FIG. 4, the shape of the heat shield plate 34 is so determined that the heat shield plate 34 makes contact with the reflector 10 at its fitting portions to the boss portions 40, 41 but is spaced from the back surface of the reflector 10 at its other portions, namely, at its portions away from the holes 42, 43. In other words, the heat shield plate 34 has a curvature set to be smaller than the curvature of the outside shape of the reflector 10 so that a gap G is maintained between the heat shield plate 34 and the reflector 10.

The heat shield plate 34 ensures that it is difficult for heat generated at the bulbs 7, 8 to be transferred to the rear side of the heat shield plate 34, so that there is little possibility that the harness 37 and the case 32 would be thermally influenced. Particularly, the presence of the gap G promises the formation of a heat insulation layer of air, whereby a further enhanced heat insulating effect can be obtained.

In the case of assembling the headlamp 5, first, the lens 13 is fitted into the reflector 10. Next, the heat shield plate 34 is fitted to the boss portions 40, 41 of the reflector 10. By this the heat shield plate 34 is positioned to a predetermined position of the reflector 10 and is fixed. Then, the annular rim 33 with the stays 30, 31 welded thereto is fixed respectively to the seats 14, 15 of the reflector 10 by use of the bolts 16, 17 and nuts 18, 19. Next, the sockets 11, 12 with the bulbs 7, 8 mounted thereto are attached to the reflector, and the couplers 35, 36 are connected to the sockets 11, 12. Finally, the case 32 is screwed to the stay (not shown) of the annular rim 33. Incidentally, this procedure of assembly can be modified appropriately.

At the time of maintenance such as attachment or exchange of the bulbs 7, 8, the case 32 can be easily detached from the reflector 10 by releasing the screw. Then, since the couplers 35, 36 and the like are not covered with a cover, the sockets 11, 12 can be directly detached from the reflector 10 and the bulbs 7, 8 or the like can be exchanged.

In addition, since the back side of the reflector 10 is covered with the heat shield plate 34, it is possible not only to obtain a heat insulating effect but also to prevent the harness 37 from being damaged, for example, by burrs of the aluminum alloy material generated upon die casting.

Next, the shape of the reflector 10 will be described more in detail. As shown in FIGS. 2(a) and 2(b), when the low beam reflector 101 and the high beam reflector 102 of the reflector 10 are viewed from the front side, they are in the shape of the number "8," which is constricted at a central portion thereof. Since the shape of the number "8" does not conform to the inside shape of the annular member 33 of the case 32, gaps are generated between the reflector 10 and the case 32. Blind portions 105, 106 are provided for filling up the gaps.

If the blind portions 105, 106 are left in the form of flat surfaces, the outside shapes of the reflective surfaces of the reflector 10 become vague, thereby lowering the appearance. If the blind portions 105, 106 are coated in black, the blind portions can be distinguished from the reflective surfaces, with the result that the outline of the reflective surfaces 101, 102 is clear. However, this approach is not preferable, because a coating step is added.

Figure 9:
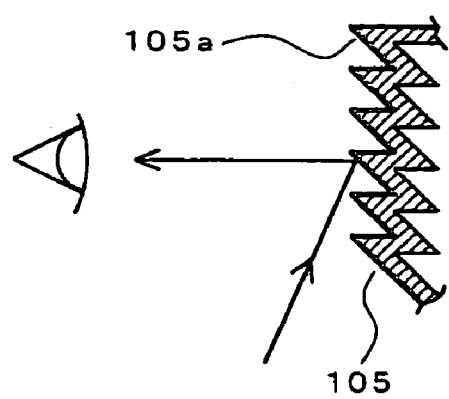
FIG. 9 is a sectional view of a blind member.

In consideration of the above, a contrivance as to the surface shape of the blind portions 105, 106 has been made so as to ensure that the blind portions 105, 106 appear black. FIG. 9 is a sectional view of the blind portion 105, and the blind portion 106 is also formed in the same manner. As shown in FIG. 9, the front surface of the blind portion 105 is a rugged shape, which is provided with surfaces 105a inclined to the lower side. The surfaces 105a ensure that light from the ground, namely, light from a dark surface is incident on the eyes of a person looking at the vehicle from the front side of the vehicle, resulting in such an effect that the blind portion 105 appears in a black color different from the color of the reflective surfaces 101, 102.

In addition, to ensure that the low beam reflector 101 and the high beam reflector function independently from each other and each thereof is not interfered by the light from the other thereof, a boundary wall 103 is disposed at the boundary therebetween. The boundary wall 103 is provided with a cutout in a central portion thereof. Specifically, as viewed from the upper side, the boundary wall 103 has both end portions roughly in contact with the surface of the lens. However, as shown by way of section in FIG. 4, a central portion of the boundary wall 103 is recessed from the surface of the lens. Thus, the overall shape of the boundary wall 103 is, for example, a smooth recessed shape as viewed from the upper side. This shape of the boundary wall 103 is effective for efficiently directing the low beam generated by the upper bulb 7 toward the front lower side of the vehicle and for preventing the boundary wall 103 from being thermally damaged by the light energy. Besides, this shape is good on a design basis.

While the pointing direction for deflecting the fixed-side coupler 11 by the predetermined angle α has been described in the foregoing, when the pointing direction is set on the side where the auxiliary bulb (position lamp) 9 is present, the harness 37 extending from the fixed-side coupler 11 and a wire extending from the auxiliary bulb (position lamp) 9 can be easily bundled with each other, to permit neat wiring on the back side.

As is clear from the above description, according to the present invention, the attachment and detachment of the first movable-side coupler can be carried out smoothly, since the first movable-side coupler does not make contact with the second fixed-side coupler at the time of attaching and detaching the first movable-side coupler to and from the first fixed-side coupler. In addition, since the first and second fixed-side couplers are located in the same plane, the thickness of the system in the front-rear direction can be reduced and, further, it is possible to neatly lay out a harness on the back side.

In addition, according to the present invention, the first movable-side coupler can be smoothly attached and detached without interference with the second fixed-side coupler, and the second fixed-side coupler can be easily attached and detached by forces in upward and downward directions.

The present invention provides a head light system that can be constituted to be compact in the vertical direction, and it is possible to neatly lay out the harness on the back side.

In addition, according to the present invention, the direction characteristics of the light generated by the first and second bulbs can be made favorable, and trouble due to generation of heat at the boundary wall can be prevented.

Furthermore, according to the present invention, the low beam generated by the first bulb can be easily cast toward the front side of the vehicle.

As is clear from the above description, according to the present invention, it is possible to protect the harness and the case from the heat generated at the bulb. Therefore, it is unnecessary to raise the heat resistance grades of the harness and the case, which contributes to a reduction in cost. In addition, even where the reflector is formed, for example, by a die casting method accompanied by the generation of burrs, there is little possibility that the harness or the like would be damaged by the burrs. In addition, according to the present invention, it is easy to mount the heat shield plate, and there is no need for a component part such as a stay for supporting the heat shield plate, so that mass-productivity is enhanced.

According to the present invention, it is possible to protect the harness and the case by the heat insulation layer of air in addition to the heat shield plate. In addition, a high heat insulating effect can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is Claimed is:

1. A head light system comprising:
   a first bulb;
   a second bulb;
   a first fixed-side coupler attached to said first bulb; and
   a second fixed-side coupler attached to said second bulb;
   wherein said first fixed-side coupler and said second fixed-side coupler are so disposed that the attaching and detaching directions of a first movable-side coupler and a second movable-side coupler respectively attached to and detached from said first fixed-side coupler and said second fixed-side coupler are substantially perpendicular to the longitudinal direction of said first bulb and said second bulb and that said first fixed-side coupler and said second fixed-side coupler are located substantially in the same plane;
   said first fixed-side coupler is so disposed that said second fixed-side coupler is not located in the attaching and detaching direction of said first movable-side coupler attached to and detached from said first fixed-side coupler; and
   wherein an attaching and detaching direction of said second moveable-side coupler to and from said second fixed-side coupler is not located in an attaching and detaching direction of said first moveable-side coupler to and from said first fixed-side coupler.

2. The head light system comprising:
   a first bulb;
   a second bulb;
   a first fixed-side coupler attached to said first bulb; and
   a second fixed-side coupler attached to said second bulb;
   wherein said first fixed-side coupler and said second fixed-side coupler are so disposed that the attaching and detaching directions of a first movable-side coupler and a second movable-side coupler respectively attached to and detached from said first fixed-side coupler and said second fixed-side coupler are substantially perpendicular to the longitudinal direction of said first bulb and said second bulb and that said first fixed-side coupler and said second fixed-side coupler are located substantially in the same plane;
   wherein said first fixed-side coupler is so disposed that said second fixed-side coupler is not located in the attaching and detaching direction of said first movable-side coupler attached to and detached from said first fixed-side coupler; and
   wherein said first fixed-side coupler and said second fixed-side coupler are disposed on substantially vertical straight lines in side view, the attaching and detaching direction of said first moveable-side coupler to and from said first fixed-side coupler is at a fixed angle against the vertical direction as viewed from the back side, and the attaching and detaching direction of said second moveable-side coupler to and from said second fixed-side coupler is substantially the vertical direction.

3. The head light system as set forth in claim 1, wherein said first fixed-side coupler and said second fixed-side coupler are disposed adjacent to each other.

4. The head light system as set forth in claim 1, wherein said first movable-side coupler includes latch portions for mating with a cutout for securing the first movable-side coupler relative to first fixed-side coupler.

5. The head light system as set forth in claim 1, wherein said second movable-side coupler includes latch portions for mating with a cutout for securing the second movable-side coupler relative to second fixed-side coupler.

6. The head light system as set forth in claim 2, wherein said first fixed-side coupler and said second fixed-side coupler are disposed adjacent to each other.

7. The head light system as set forth in claim 2, wherein a boundary wall is disposed at the boundary between a first reflector for reflecting light generated by said first bulb and a second reflector for reflecting light generated by said second bulb, and said boundary wall is provided with a cutout.

8. The head light system as set forth in claim 6, wherein said first bulb is for a low beam, and said second bulb is for a high beam.

9. A head light system comprising:
   a first bulb;
   a second bulb;
   a first fixed-side coupler attached to said first bulb; and
   a second fixed-side coupler attached to said second bulb;
   wherein said first fixed-side coupler and said second fixed-side coupler are so disposed that the attaching and detaching directions of a first movable-side coupler and a second movable-side coupler respectively attached to and detached from said first fixed-side coupler and said second fixed-side coupler are substantially perpendicular to the longitudinal direction of said first bulb and said second bulb and that said first fixed-side coupler and said second fixed-side coupler are located substantially in the same plane;
   wherein said first fixed-side coupler is so disposed that said second fixed-side coupler is not located in the attaching and detaching direction of said first movable-side coupler attached to and detached from said first fixed-side coupler; and
   wherein said first fixed-side coupler is arranged at an angle α relative to said second fixed-side coupler.

10. The head light system as set forth in claim 9, wherein wiring extending from said first fixed-side coupler extends in a direction to be displaced and out of alignment with the second fixed-side coupler.

11. A headlamp system for vehicle, comprising:
    a bulb;

a reflector having a reflective surface for reflecting light generated by said bulb to a predetermined emitting direction;

a case so disposed as to envelop a rear side portion of said reflector and supporting said reflector;

a harness disposed between said reflector and said case and electrically connected to said bulb; and a heat shield plate operatively positioned for covering a rear portion of said reflector between said reflector and said harness, wherein a gap is provided between said reflector and said heat shield plate.

12. The headlamp system for vehicle as set forth in claim 11, wherein said reflector comprises a base portion for mounting said bulb thereto, and said heat shield plate comprises a hole for engagement with the outer circumference of said base portion.

13. The headlamp system for vehicle as set forth in claim 11, wherein said heat shield is disposed between the reflector and the case for protecting the case and the harness.

14. The headlamp system for vehicle as set forth in claim 11, wherein said heat shield is in contact with said reflector at a fitting portion and is spaced from a rear side of the reflector at portions adjacent thereto.

15. A headlamp system for vehicle, comprising:
a bulb;
a reflector having a reflective surface for reflecting light generated by said bulb to a predetermined emitting direction;

a case so disposed as to envelop a rear side portion of said reflector and supporting said reflector;

a harness disposed between said reflector and said case and electrically connected to said bulb; and a heat shield plate operatively positioned for covering a rear portion of said reflector between said reflector and said harness, wherein said heat shield plate is formed of a heat-resistant rubber.

16. The headlamp system for vehicle as set forth in claim 12, wherein said heat shield plate is formed of a heat-resistant rubber.

17. A headlamp system for vehicle, comprising:
a bulb;
a reflector having a reflective surface for reflecting light generated by said bulb to a predetermined emitting direction;

a case so disposed as to envelop a rear side portion of said reflector and supporting said reflector;

a harness disposed between said reflector and said case and electrically connected to said bulb; and a heat shield plate operatively positioned for covering a rear portion of said reflector between said reflector and said harness, wherein said heat shield is displaced away from the reflector by a predetermined distance relative to said reflector.

* * * * *